United States Patent [19]

Steuer

[11] Patent Number: 5,611,272
[45] Date of Patent: Mar. 18, 1997

[54] ROTARY EMBOSSING MACHINE

[76] Inventor: Armin Steuer, Am Waldrand 30, D-71111 Waldenbuch, Germany

[21] Appl. No.: 568,818

[22] Filed: Dec. 7, 1995

[30] Foreign Application Priority Data

Dec. 24, 1994 [DE] Germany .................. 9420707 U

[51] Int. Cl.⁶ .................................................. B31F 1/07
[52] U.S. Cl. ................ 101/23; 101/25; 101/DIG. 42; 101/225; 101/228; 242/419.3
[58] Field of Search ........................ 101/23, 24, 25, 101/DIG. 42, 485, 486, 32, 33, 34, 484, 225, 228, 27; 242/417.1, 419.3; 226/27, 28, 29

[56] References Cited

U.S. PATENT DOCUMENTS

| 3,880,076 | 4/1975 | Black et al. | 101/115 |
| 4,218,026 | 8/1980 | Stange | 242/55 |
| 4,253,597 | 3/1981 | Waffner | 226/40 |
| 5,109,767 | 5/1992 | Nyfeler et al. | 101/23 |

FOREIGN PATENT DOCUMENTS

| 0415881 | 8/1990 | European Pat. Off. . | |
| 2931194 | 2/1981 | Germany . | |
| 3713666 | 11/1988 | Germany . | |
| 2118467 | 11/1983 | United Kingdom | 101/23 |

Primary Examiner—Edgar S. Burr
Assistant Examiner—Dave A. Ghatt
Attorney, Agent, or Firm—Gary M. Nath; Nath & Associates

[57] ABSTRACT

A rotary embossing machine includes an embossing mechanism in which an embossing gap is formed between an embossing cylinder and a counter pressure cylinder. For conveying an embossing film web through the embossing gap, the rotary embossing machine includes a conveying mechanism for producing a movement of the web at the same speed as a material layer to be embossed, during an embossing interval. The film conveying mechanism includes a pulling device downstream of the embossing gap which is provided with a slip drive for the embossing film web and a controllable film supply device upstream of the embossing gap which cooperates with the pulling device. This arrangement avoids the risk of the embossing films or foils tearing and improves the embossing quality.

17 Claims, 1 Drawing Sheet

ROTARY EMBOSSING MACHINE

BACKGROUND OF THE INVENTION

The invention relates to a rotary embossing machine.

In rotary embossing machines according to the preamble by means of a material layer to be embossed, guided at a constant speed through the embossing gap, an embossing foil or sheet web is so moved that during an embossing interval it travels at the same speed as the material layer. This is necessary so that the embossing material, e.g. discreet, successive embossing units such as pictures or texts, or a part of an ink film to be embossed, can pass in undistorted/unsmeared manner onto the material layer to be embossed and consequently the embossing foil or sheet web does not tear during the embossing interval.

In the case of embossing foil webs with discreet embossing foil units a very good registration stability, i.e. a positional accuracy of the embossing unit with respect to the intended embossing point is sought. However, with embossing foils with ink films the aim, for minimizing waste with unused ink film areas, is to obtain a minimum spacing between succeeding ink film areas still to be embossed from the preceding, ink film areas already removed by embossing.

In order to save material, the aim is for successive ink film areas to be embossed and generally also successive embossing units on the embossing foil web closer together than successive embossing locations on the material layer. This makes it necessary for the embossing foil web to be guided more slowly outside the embossing interval than the material layer, but before the embossing interval is accelerated to the material layer speed and is then decelerated again and optionally also retracted. These speed changes are brought about by foil accelerating means, this foil acceleration being understood to mean both a speed rise and a speed drop, as well as a direction reversal of the foil web movement.

A rotary embossing machine with feed speed increase and decrease operating according to the hot embossing process is disclosed in DE-OS 29 31 194. As a result of the high accelerations/decelerations required in particular at high operating speeds, the in certain circumstances relatively tension-sensitive embossing foil web can be exposed to strong stresses, which can distort the web up to tearing and can therefore reduce the embossing quality and give rise to operating faults. For extending the acceleration paths and therefore for reducing the degree of acceleration and tensile loading in the longitudinal direction, it is proposed in DE 37 13 666 A1 to retract the embossing foil web prior to each new embossing interval, so as to permit a longer "starting distance" and also a longer "braking distance".

As is e.g. shown in EP 415 881 A2, forward and reverse movements of paper webs relatively insensitive to longitudinal tensile stresses are already used for register and print length correction in printing presses. Guide rollers upstream and downstream of the printing gap controllable with respect to the rotation speed and direction ensure the paper web advance and return by means of partly briefly mutually displaced movements coordinated by means of a complicated control means and there can be brief web tension peaks or also a complete failure of the web tension.

The aforementioned embossing foil web-typical risks of distortion or tearing of the web in the case of acceleration processes could admittedly be reduced by slowing down the acceleration paths in the described way. However, the direct adoption of solution suitable in certain circumstances for paper web guidance for sensitive embossing foils or sheets could, if at all, only be successful with considerable control equipment costs. Foil stability problems can in particular occur with thinner embossing sheets, which are more sensitive to optionally even short, pronounced longitudinal stressing during the acceleration processes.

OBJECTS OF THE INVENTION

The object of the invention is to so further develop a rotary embossing machine of the aforementioned type that the sought registration stability on the one hand and reduction of waste on the other is improved, particularly in the case of foils or sheets sensitively reacting to mechanical stressing, particularly when the described acceleration processes act on the foil or sheet. In particular the risk of the embossing foil sheet tearing is to be avoided and the embossing quality improved.

SUMMARY OF THE INVENTION

According to the invention this problem is solved by a rotary embossing machine, which is characterized in that the foil accelerating means have a pull device following the embossing gap with a slip drive for the embossing foil web and a controllable foil supply device, upstream of the embossing gap and cooperating with the pull device.

A combination of a pull device with a slip drive, which can but need not be controlled, with a controllable foil supply device is proposed, which permits no slip in the embossing foil web direction and therefore can precisely define the position of the web in the conveying direction. The slip drive has components, which act in the pulling direction on the embossing foil web. Whereas in the case of conventional pull devices the embossing foil web is guided e.g. between contrarotating, pressed together draw rolls, which jam the embossing foil web, the slip drive preponderantly and preferably exclusively in sliding friction between the embossing foil web and a pull element. Whereas in the case of pull devices operating with force closure, such as the draw rolls jamming the embossing foil web, any relative speed change between the pull device and the foil supply device has a drastic effect on the web tension, a slip drive utilizing the sliding friction principle allows changes to said speeds with respect to one another without significant web tension changes. The web tension can be kept substantially constant. At least it only has limited fluctuations and in no case does it have stress peaks or a complete web tension failure. This avoids "tugging" on the web, which reduces the risk of the embossing foil web tearing. In the vicinity of the embossing gap there are largely constant tension ratios, which improves the embossing quality.

As the pull device does not tug on the embossing foil web, the positional accuracy of the embossing material is solely dependent on the control accuracy of the foil supply device. Consequently there is no need for a control connection between the foil supply device and the pull device, which is e.g. necessary upstream and downstream of the embossing gap with mechanisms having controlled guide cylinders.

In the case of a rotary embossing machine according to the invention in the forward operation the preferably uncontrolled pull device acts as a member pulling the embossing foil web, whereas the foil supply device serves as a regulatable retaining member, which subsequently supplies the embossing foil web in a precisely controlled manner. However, in return operation the foil supply device acts as a controlled pull element, whereas the pull device serves as a preferably uncontrolled brake element, which as a result of the slip drive always keep the embossing foil web under a roughly constant web tension. In both cases only the foil supply device is responsible for the positional accuracy of the embossing material relative to the material layer. This advantageously permits on the one hand high foil accelerations, which in turn permit high operating speeds for the device, but on the other minimum web tension fluctuations, whilst simultaneously giving the possibility of controlling the length position of the embossing foil web at any time and in accurate manner through the foil supply device. Thus, with embossing foil webs having discreet embossing units it is possible to achieve precise registration stability and in the case of embossing foil webs with ink films a substantially jointless attachment of successive ink film areas to be embossed to preceding, already embossed areas, which reduces waste.

The slip drive can advantageously have a driving face movable in the embossing foil web conveying direction and onto which the web can be zonally pressed whilst building up the sliding friction. It is also possible to provide several driving faces. The driving faces can e.g. be curved in the manner of a roller shell portion. Preferably a driving face is zonally flat. In a preferred embodiment the slip drive is constructed as a conveyor belt forming with a portion of its outer surface the driving face and passing round parallel-displaced pulleys. The back of the embossing foil web can rest on said belt. To bring about the pressing of the embossing foil web on the conveyor belt it is advantageously possible to provide in the vicinity of the driving face suction means, which produce a vacuum between the web and the belt. It is also conceivable, to press by means of e.g. a blower using an air flow the embossing foil web onto the conveyor belt. Pressing means, e.g. brushes or the like, contacting the top of the embossing foil web are also conceivable.

If for the pressing of the embossing foil web use is made of suction means, the latter can be so constructed that the conveyor belt has openings and in the vicinity of the driving face there is at least one at least partly opened vacuum generator towards the inner face of the conveyor belt. It can advantageously be constructed as a vacuum box with a suction fan. The suction fan can suck air through the openings of the vacuum generator and the openings of the conveyor belt. In areas where the openings are covered by the embossing foil web, the latter is sucked onto the conveyor belt.

A control of the intensity of the sliding friction between the embossing foil web and the driving face can take place by means of the forward speed of the conveyor belt and/or the suction force of the vacuum generator. In principle, no control is needed and is also not provided in a preferred embodiment. The conveyor belt can be driven directly or e.g. by means of a driving belt by a driving motor.

The foil supply device can have at least one control roller controllable as regards rotation speed and/or rotation direction by a control mechanism and which is in rolling contact with the embossing foil web. By means thereof forward movements and preferably both forward and reverse movements of the embossing foil web can be brought about with varying speeds. The embossing foil web can e.g. be tangentially moved past the control roller and controlled under pressure on an impression cylinder with regards to its speed and optionally direction. In a preferred embodiment the foil supply device only has one control roller. The latter can be looped in a circumferential portion by the embossing foil web, so that the control rollers also serves as a guide roller. Advantageously the control roller is looped over roughly half its circumference. A looping can ensure a reliable contact between the control roller and the embossing foil web without any slipping or sliding.

The embossing foil web can be pressed onto the control roller e.g. by a further roller. It must be noted that in the case of a mechanical pressing action, such as could take place by an opposing roller, the sensitive top of the embossing foil still carries on the supply side of the conveying mechanism, i.e. upstream of the embossing gap, the embossing units or ink film, which could be damaged by mechanical pressing action. In a preferred embodiment the control roller is constructed as a vacuum or suction roller. However, the control roller can also be driven by means of a driving motor programmable with respect to its driving speed and direction. By means of a foil movement program of the motor control the described forward movements, accelerations and optionally reverse movements can be controlled. The non-uniform movement of the embossing foil web produced by the foil accelerating means requires special precautions in the supply and removal of the web. The corresponding devices should only require low control expenditure and in particular on the supply side should neither tug the embossing foil web or mechanically load it in any other way, e.g. by scratching or the like. In a preferred embodiment the conveying mechanism has a source for the embossing foil web, preferably an unwinding storage reel and on the removal side a receptacle, preferably a winding storage reel, for in each case one embossing foil web and between said foil storage means for the reception of portions of said web. Appropriately one or more foil accumulators, with respect to the path of the embossing foil web, can e.g. be positioned between the unwinding storage reel and the foil accelerating means. On the removal side one or more foil accumulators can be located between the foil accelerating means and the used embossing foil web reception mechanism.

Preferably the foil accumulators have a foil supply accumulator upstream of the foil supply device and receiving a loop portion of the embossing foil web and which is preferably constructed as a vacuum container. The vacuum can be used for keeping the loop portion, which due to the discontinuous movement of the embossing foil web has a variable length, under a slight tension in all positions and preferably without folding the web. Unlike in the case of the known dancer rolls, which are e,g. used in printing presses for paper web tension in the accumulator areas, the guidance in the vacuum container can take place largely without contact of the embossing foil web with the guidance elements. In a preferred embodiment the foil supply accumulator can be constructed as a preferably elongated container preferably having at the bottom at least one opening for receiving the loop portion and which has at least one vacuum generator for sucking in the loop portion. The generator can be in the form of a suction fan, which can be positioned facing the reception side and in frontal manner on the container. The container length can be such that it exceeds the loop portion length, even in the case of maximum accumulator filling.

The foil supply accumulator appropriately has at least one fill level sensor connectable for fill signal transmission to a control device. Advantageously there is a first and a second fill level sensor, the first sensor emitting a signal to the control device on reaching the fill level maximum and the second sensor on reaching the fill level minimum. On reaching the fill level maximum said signal can reduce the supply speed of the embossing foil web e.g. through the unwinding storage reel, so that the foil accelerating means remove more web per time unit from the accumulator than is subsequently supplied. If the fill level minimum detected by the second fill level sensor is reached, then the control device can increase the supply speed. In this way there is always a "tolerance" for the discontinuous movement of the embossing foil web produced by the foil accelerating means.

Also on the removal side, i.e. following the pull device, a corresponding foil accumulator can be provided. As the demands on the removal side for minimum damage to the foil web are reduced, conventional dancer rolls can be used. In a preferred embodiment a foil accumulator is provided, which is also constructed as a vacuum container and preferably the foil removal accumulator and foil supply accumulator are substantially identically constructed. In particular, the foil removal accumulator can have two fill level sensors for the minimum and maximum filling levels. In this way the tensile force brought about on the embossing foil web by the foil removal accumulator can be kept so low as is necessary for ensuring a crease-free guidance of the web. The operation of the pull device, particularly the slip drive, is influenced in this way as little as possible, e.g. through tugging on the embossing foil web.

In the case of the invention the embossing foil or sheet web is provided with only slightly mechanically stressing means tugging thereon for foil supply and removal, as well as foil accelerating means placing the web under minimum tension changes. The device consequently brings about an improved embossing quality and registration stability, together with a more troublefree sequence of embossing, particularly at high operating speeds and with sensitive embossing foils. It is in particular suitable for the described forward/return operation of the foil, but also in the case of operating sequences where the foil runs substantially uniformly still improves the registration accuracy. The construction according to the invention is more particularly suitable for hot embossing rotary machines, in which the embossing cylinder for the hot embossing foil webs has at least one heatable die.

BRIEF FIGURE DESCRIPTION

These and further features can be gathered from the claims, description and drawings and the individual features, both singly and in the form of subcombinations, can be implemented in an embodiment of the invention and in other fields and represent advantageous, independently protectable constructions, for which protection is hereby claimed. An embodiment of the invention is shown in FIG. 1 in the form of a diagrammatic side view of a rotary embossing machine according to the invention.

DETAILED DESCRIPTION OF A PREFERRED EXAMPLE EMBODIMENT

Figure 1:
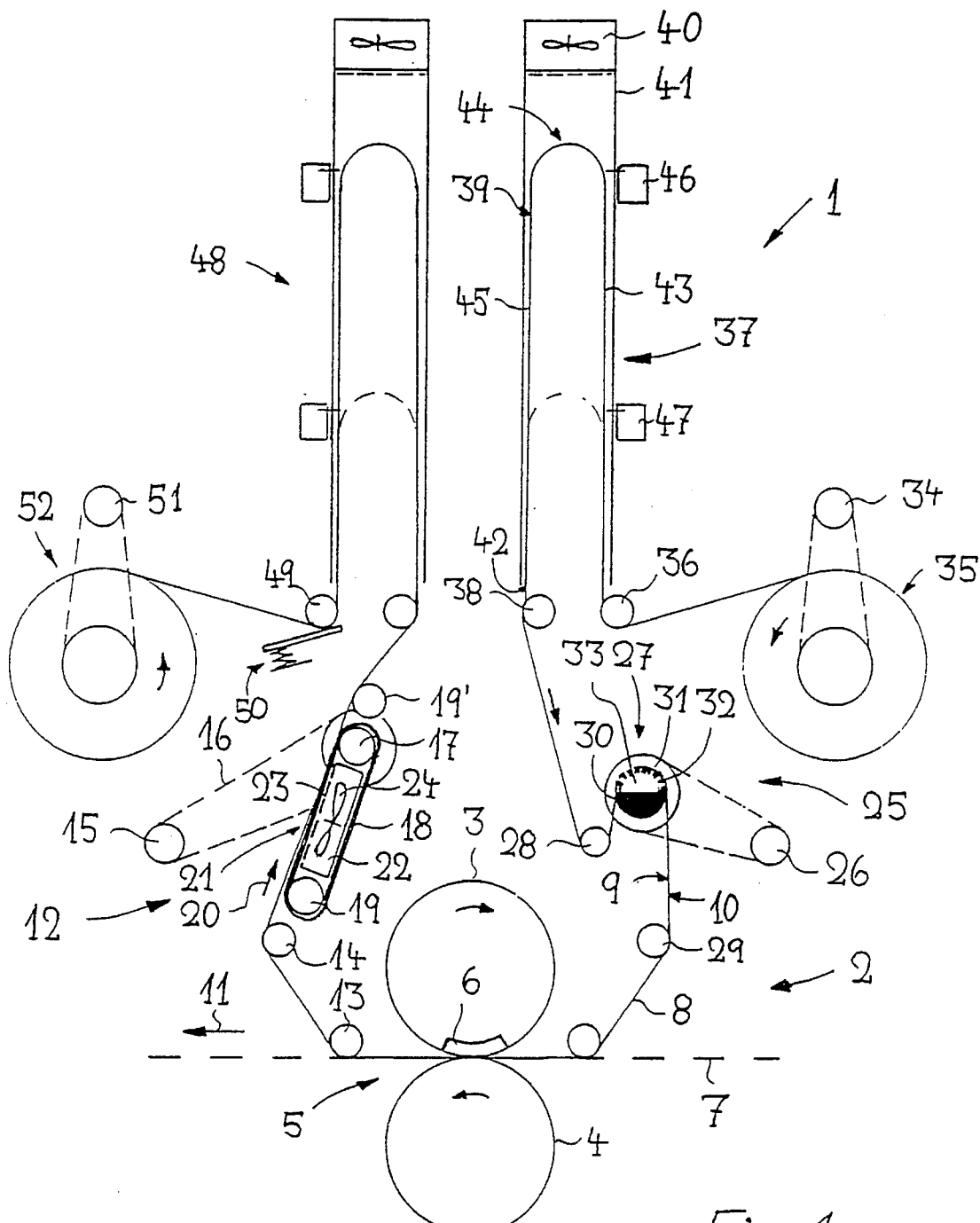

The hot embossing rotary machine 1 in FIG. 1 is e.g. used for embossing successive sheets or a web made from paper, cardboard or plastic. It has an embossing mechanism 2 with a horizontal embossing cylinder 3 and a roughly identically large, underlying impression cylinder 4, between which an embossing gap 5 is formed. The embossing cylinder 3 is provided along its circumference with at least one heatable embossing die 6, which embosses an embossing unit located on the embossing foil or sheet web 8 on a passing through material layer 7. The embossing foil web 8 has a back 9 and a sensitive hot melt adhesive-possessing front 10. FIG. 1 shows the device during an embossing interval, when the material layer 7 and the embossing foil web 8 have in the vicinity of the embossing gap 5 the same movement direction 11 and pass at the same speed through the gap 5.

In the conveying direction following the embossing gap 5 is provided a pull device 12, to which the embossing foil web is passed by means of two guide pulleys 13, 14. The pull device has a driving pulley 17 driven by means of a driving belt 16 from a driving motor 15. By means of the driving pulley 17 a conveyor belt 18 passing round a guide pulley 19 is driven. The driving pulley 17 and the guide pulley 19 are so arranged in axially parallel, mutually displaced manner, that the conveyor belt 18 in its area facing the embossing foil web 8 is substantially parallel to said web 8, which in this area runs between the guide pulleys 14 and 19', whose relative position determines in said area the conveying direction 20. Between the pulleys 17 and 19 on the side facing the embossing foil web 8, the conveyor belt 18 in each case forms a substantially planar driving face 21 moved parallel to the embossing foil web in the conveying direction 20.

In the conveyor belt 18 are provided openings extending from its outside to its inside and having such a width that the embossing foil web partly or completely covers the openings when engaging on the belt in the vicinity of the driving face 21, as a function of the width thereof.

Between the pulleys 17 and 19 and between the conveyor belt portions guided by them is located a vacuum generator constructed as a suction box 22 and which in the vicinity of the driving face 21 has, parallel thereto, a perforated cover 23 through which the air can be sucked into the suction box through a fan 24. The perforated cover 23 is so close to the inside of the conveyor belt 18 in the vicinity of the driving face 21 that the suction of air substantially takes place through the conveyor belt openings, so that an engaging embossing foil web is sucked onto the driving face 21 and is consequently pressed onto the same.

If the web speeds of the conveyor belt 18 and the embossing foil web 8 are the same in the conveying direction 20, in the vicinity of the driving face 21 static friction can build up between the web and the conveyor belt. If the web speeds differ in that the conveyor belt is moved faster in the conveying direction 20 than the embossing foil web, then sliding friction occurs between the conveyor belt and the web. The pull device 12 in this case operates as a slip drive, which pulls the embossing foil web 18 in the conveying direction, without in the case of opposing forces acting counter to the conveying direction 20 there being any tugging on the embossing foil web and consequently the latter cannot be damaged. The pull device preferably operates exclusively as a slip drive, so that additional forces acting on the web on passing between static and sliding friction are avoided.

Upstream of the embossing gap 5 is a foil or sheet supply device 25 controlling the foil or sheet supply. A driving motor 26 programmable with regards to the rotation direction and speed drives, by means of a driving belt, a control roller 27 which is consequently controllable as regards rotation speed and/or direction, by means of which the embossing foil web 8 is so guided over guide pulleys 28, 29, that the control roller 27 is looped by the embossing foil web 8 over the upper half of its circumference. The control roller 27 and embossing foil web 8 are in rolling contact. The control roller is constructed as a vacuum or suction roller. It has a fixed roller core 30 around which rotates a roller sleeve 32 provided along its circumference with through openings 31.

The roller core 30 is constructed in the form of a cylinder sector and has a semicylindrical recess 33 open towards the imaginary edge of the cylinder. The roller core and roller sleeve are so sealed against one another that the cavity formed in the vicinity of the edge recess is only open towards the rolling face of the suction roller in the vicinity of the roller sleeve openings 31 adjacent thereto. The suction roller 27 is looped in this area and only in the said area looped by the embossing foil web can it be sucked onto the roller sleeve 32.

A not shown vacuum generator, e.g. a suction fan, connected to the cavity 33 ensures that air can be sucked through the openings 31 as long as the latter are not closed. If the embossing foil web loops the control roller 27 in such a way that the openings 31 are partly and preferably completely covered, then the contact in this area is reinforced by the web suction. The construction of the control roller 27 as a suction roller has the advantage that an adhesive contact with respect to the control roller 27 is produced, which is appropriate for the driving of the embossing foil web and is in particular adequate counter to the tensile force of the pull device, without the sensitive front 10 of the web 8 being contacted. This avoids any risk of damage to the embossing units or ink film still on the embossing foil web. A slipping of the embossing foil web from the control roller is avoided through the suction action and the adhesive contact produced by it. Where the roller sleeve with its openings 31 reaches the roller core 30, the vacuum is eliminated for the embossing foil web, which permits an easy detachment.

The foil or sheet supply to the suction roller 27 controlling the speed and movement direction of the embossing foil or sheet web takes place, starting from an unwinding storage reel 35 drivable by a driving motor 34, by means of a guide pulley 36 into the downwardly open, longitudinal box-shaped foil or sheet supply accumulator 37, where between the guide pulley 36 and a further guide pulley 38, the web 8 forms a loop portion 39, which is sucked through a suction fan 40 into the box 41 of the accumulator 37. The suction fan is arranged at the top and frontally opposite the entrance opening 42 of the otherwise closed box 41 and ensures that the loop portion is always in the stretched out state, in which the embossing foil web 8 passes from the guide pulley 36 over the loop leg 43 to the apex area 44 and from there over the loop leg 45 to the guide pulley 38. The air supply sucked through the entrance opening 42 past the loop legs ensures that the back 9 of the embossing foil web does not contact the box 41. The sensitive front 10 of the embossing foil web only has contact with the guide pulley 38. In the represented embodiment the foil supply accumulator 37 is filled up to the fill level maximum indicated by the first fill level sensor 46. On reaching the fill level minimum indicated by the second fill level sensor 47, the embossing foil web passes along the broken line within the box 41.

On the removal side the pull device is followed by a foil removal accumulator 48 in mirror symmetrical manner to the foil supply accumulator 37. As for the foil supply accumulator, the fill level sensors are located on the easily accessible outside of the accumulator. On the foil exit side of the foil removal accumulator is located a foil brake 50 pressing the web against a guide pulley 49 and which ensures that the web is not drawn too strongly out of the foil removal accumulator 48 by a winding-up storage reel 52 driven by a driving motor 51.

Prior to the starting up of the rotary machine a new unwinding storage reel is inserted and is then wound around the guide pulleys 36 and 38 in such a way that a loop portion is drawn into the foil supply accumulator. The vacuum allows an easier accumulator filling and the embossing foil web can consequently easily be kept under tension, which facilitates the further threading through the foil supply device 25, embossing gap 5 and over and beyond the pull device 12 into the foil removal accumulator. Here the loop portion of the embossing foil web can also be sucked in and is then guided through the area of the foil brake 50 on the winding reel 52.

Following the threading of the embossing foil web and the material layer 7 the embossing process can begin and then the device operates in the following way. The pull device 12 is operated at a constant driving speed in such a way that the conveyor belt speed is slightly higher than the maximum speed of the embossing foil web, as can occur in the described acceleration processes prior to embossing. As a result of the vacuum produced by the fan 24 between the embossing foil web and the driving face 21 of the conveyor belt, the web is constantly sucked onto the driving face 21 moved in the conveyor direction 20 and is kept under tension, the slip between the embossing foil web and the conveyor belt preventing web tension peaks or a complete web tension failure.

The speed of the embossing foil web in the embossing gap and optionally also the movement direction is controlled by the control roller 27, which is controlled by the program advance of a not shown control device. The unwinding speed from the unwinding storage reel corresponds, in precisely the same way as the winding up speed of the winding storage reel, the average advance speed of the embossing foil web in the embossing gap 5.

Prior to the embossing interval the embossing foil web speed is slowed down by decelerating the control roller 27 as compared with the average web speed, so that there is a certain increase in the filling level of the foil supply accumulator 37. At this stage the pull device 12 is in slip operation with a higher speed difference between the embossing foil web and the driving face. When an embossing die approaches the embossing gap the control device speeds up the control roller in such a way that the pull device 12 in positionally and time-precise manner pulls or draws an embossing unit into the vicinity of the embossing die reaching the embossing gap. The embossing foil web speed is obtained in that the embossing foil web looping the control roller adheres thereto due to vacuum and can consequently only move with precisely the circumferential speed and direction of the control roller. The pull device 12 with slip drive exerts a substantially speed-independent tensile force on the embossing foil web, so that the web tension is substantially constant and only fluctuates to a limited extent without any peaks.

During the embossing interval the circumferential speeds of the control roller 27, embossing cylinder 3 and impression cylinder 4, as well as the web speeds of the embossing foil web 8 and material layer 7 are substantially identical. The web speed of the conveyor belt exceeds said speed to preferably a limited extent, so that preferably there is no static friction between the embossing foil web and the conveyor belt.

After the embossing die has passed through the vicinity of the embossing gap, with which the embossing process is at an end, the web speed of the embossing foil web is reduced by decelerating the control roller 27 to below the average advance speed of the web and optionally the web 8 is moved back somewhat by rotating back the control roller, so as to provide for the next embossing process a longer starting path for the acceleration. At this stage the pull device acts as an uncontrolled retention device, whereas the control roller acts as a controlled tension device against the web tension kept substantially constant by the pull device.

In the phases in which the actual web speed of the embossing foil web exceeds the average advance speed, the filling level of the foil supply accumulator 37 decreases, whereas the filling level of the foil removal accumulator 48 increases. With actual advance speeds below the average advance speed and in particular on moving back the embossing foil web, the relationships are reversed. As a result of the advantageous construction of the foil accumulators as vacuum or suction accumulators, the range of the foil accelerating means 25, 12 and the embossing mechanism 2 are largely uncoupled from the remaining foil web supply and removal with respect to the tensile forces exerted on said web. The limited forces acting in the web direction and which are brought about by the foil accumulators on the embossing foil web, ensure in the vicinity of the supply to the foil supply device and in the vicinity of the removal behind the pull device for only limited tensions or forces along the web, so that the foil accelerating means roughly "see the free ends" of the foil web. These limited external forces outside the foil accelerating means contribute to the constant web tension and only limited web tension fluctuations of the embossing foil web. This also makes it possible to avoid operational problems, such as can e.g. arise through the tearing of a foil or sheet. The foil accelerating means can also precisely control the position of the foil at any time in such a way as to ensure improved registration stability for embossing units or a substantially jointless attachment to ink film areas to be embossed.

The fill level sensors on the foil accumulators assist this action, in that e.g. on reaching the fill level minimum the second fill level sensor 47 delivers a signal to the control device and the latter then increases the rolling speed of the unwinding storage reel 35, so that there is no drop below the fill level minimum. Conversely a signal of the first fill level sensor 46, via the control device leads to a slowing down of the rotation speed of the unwinding storage reel. The same applies for the interaction of the control device with the fill level sensors of the foil removal accumulator and the unwinding storage reel.

I claim:

1. Rotary embossing machine comprising:

an embossing mechanism including an embossing cylinder and an impression cylinder, the impression cylinder positioned adjacent to the embossing cylinder such that an embossing gap is formed between the embossing cylinder and the impression cylinder;

a conveying mechanism for conveying an embossing foil web through the embossing gap in a conveying direction, the conveying mechanism having foil conveying means for producing, during an embossing interval, a movement of the embossing foil web with a speed identical to the speed of a material layer to be embossed, the foil conveying means comprising a pull device positioned downstream of the embossing gap, the pull device having a slip drive for the embossing foil web, and the foil conveying means further comprising a controllable foil supply device positioned upstream of the embossing gap and cooperating with the pull device.

2. Rotary embossing machine according to claim 1, wherein the foil conveying means includes means for producing a movement of the embossing foil web with a non-uniform speed.

3. Rotary embossing machine according to claim 1, wherein the foil conveying means includes foil accelerating means for forward/reverse operation for producing a forward/reverse movement of the embossing foil web through the embossing gap.

4. Rotary embossing machine according to claim 1, wherein the slip drive comprises a driving face movable forward in the conveying direction and pressing means for producing a pressing action of the embossing foil web onto the driving face such that the embossing foil web is pressed against the driving face whilst building up sliding friction between the driving face and the embossing foil web.

5. Rotary embossing machine according to claim 4, wherein the slip drive comprises a conveyor belt having an outer surface, wherein a flat portion of the outer surface forms the driving face.

6. Rotary embossing machine according to claim 4, wherein the pressing means includes suction means for producing a partial vacuum between the driving face and the embossing foil web.

7. Rotary embossing machine according to claim 5, wherein the conveyor belt is perforated and wherein at least one vacuum generator is positioned opposite of the driving face and is at least partially open towards the inner face of the conveyor belt.

8. Rotary embossing machine according to claim 1, wherein the foil supply device includes at least one control roller in rolling contact with the embossing foil web and a controlling device operatively connected to the control roller for controlling the rotational speed and direction of the control roller.

9. Rotary embossing machine according to claim 8, wherein the foil supply device has a single control roller which is looped by the embossing foil web in a circumferential portion, preferably along roughly half its circumference.

10. Rotary embossing machine according to claim 9, wherein the control roller is constructed as a vacuum roller with a fixed roller core having a marginal recess and a roller sleeve rotating round the roller core and provided along its circumference with through openings, a cavity being formed between the roller core and the roller sleeve in the vicinity of the marginal recess, the cavity being connected to a vacuum generator and the cavity being located adjacent to the circumferential portion looped by the embossing foil web.

11. Rotary embossing machine according to claim 1, wherein the conveying mechanism includes an unwinding storage reel and a winding storage reel for the embossing foil web, and foil accumulators for receiving embossing foil web portions, the foil accumulators being positioned between the unwinding storage reel and the winding storage reel.

12. Rotary embossing machine according to claim 11, wherein the foil accumulators comprise a foil supply accumulator located upstream of the foil supply device and receiving a loop portion of the embossing foil web, the foil supply accumulator includes a vacuum container with an opening for receiving the loop portion of the embossing foil web.

13. Rotary embossing machine according to claim 12, wherein the foil supply accumulator includes a container which has on a lower front face at least one opening for receiving the loop portion and which for sucking in the latter has at least one vacuum generator.

14. Rotary embossing machine according to claim 12, wherein the foil supply accumulator includes at least one fill level sensor for detecting the filling state of the foil supply accumulator, the fill level sensor being adapted to transmit a fill signal to a control device.

15. Rotary embossing machine according to claim 12, wherein the foil supply accumulator includes a first and a second fill level sensor, the first fill level sensor emitting a signal on reaching a fill level maximum and the second fill level sensor emitting a signal on reaching a fill level minimum.

16. Rotary embossing machine according to claim 11, wherein the foil accumulators comprise a foil removal accumulator positioned downstream of the pull device and receiving a loop portion of the spent embossing foil web, the foil removal accumulator having a vacuum container.

17. Rotary embossing machine according to claim 12, wherein the foil removal accumulator and the foil supply accumulator are identically constructed.

* * * * *